3,305,578
METHOD OF PREPARING SUBSTANTIALLY PURE AMINO ACID SALTS OF ALKYL SULFURIC ACIDS
Elmer W. Maurer and Alexander J. Stirton, Philadelphia, and James K. Weil, North Wales, Pa., assignors to the United States of America as represented by the Secretary of Agriculture
No Drawing. Original application Apr. 8, 1960, Ser. No. 21,066, now Patent No. 3,133,946, dated May 19, 1964. Divided and this application Oct. 2, 1963, Ser. No. 313,400
7 Claims. (Cl. 260—459)

A non-exclusive, irrevocable royalty-free license in the invention herein described, throughout the world for all purposes of the United States Government, with the power to grant sublicenses for such purposes, is hereby granted to the Government of the United States of America.

This application is a division of application bearing Serial No. 21,066, filed April 8, 1960, and now U.S. Patent No. 3,133,946.

This invention relates to long chain alkylsulfuric acids and to an improved process for the preparation of metal alkyl sulfates as well as salts with nitrogenous bases such as amines and amino acids. The long chain alkylsulfuric acids have now been isolated for the first time as pure compounds with definite melting points. Many of the salts are new compounds with unusual properties.

The long chain alkylsulfuric acids of our invention have the general formula $ROSO_3H$ where R is an n-alkyl group of 12 to 22 carbon atoms; the salts have the general formulas $(ROSO_3)_nM$ where when M is a monovalent metal, an ammonium radical or a substituted ammonium radical corresponding to a nitrogenous base $n=1$, when M is a divalent metal $n=2$, and when M is a trivalent metal, then $n=3$.

An object of our invention is to provide long chain alkylsulfuric acids which are surface active agents with unusual properties differing considerably from those of the corresponding sodium alkyl sulfates.

The long chain alkylsulfuric acids which we have isolated for the first time in a pure state are white crystalline solids with sharp melting points, soluble in aqueous and organic solvents such as ethers, esters, ketones, kerosene, turpentine, and paraffinic, aromatic and chlorinated hydrocarbons. In contrast the sodium alkyl sulfates are insoluble in these organic solvents and are less soluble in water, particularly in the case of sodium octadecyl sulfate which has a solubility of only 0.02% at 25° C. Although the long chain alkylsulfuric acids are esters of a strong inorganic acid, we have discovered that alkylsulfuric acids such as octadecylsulfuric acid are ionized only to the extent of about 50% in aqueous solution and appear to exist as incompletely ionized micelles with a critical micelle concentration (c.m.c.) only one-third that of sodium octadecyl sulfate.

A further object of our invention is to provide an improved method for the preparation of salts of long chain alkylsulfuric acids, in a pure state by a simple process, based upon the isolation of the long chain alkylsulfuric acid.

Sodium salts of long chain alkylsulfuric acids are widely known detergents and surface active agents manufactured from the long chain alcohols corresponding to coconut oil or hydrogenated tallow by sulfation with excess of sulfuric acid or other sulfating agent, with subsequent neutralization of the sulfation mixture by sodium hydroxide. The product contains sodium sulfate and unsulfated long chain alcohols and further extraction and purification would be required to obtain a substantially pure sodium alkyl sulfate. Other salts such as the potassium salt can be prepared in the same way by neutralization of the reaction mixture but final purification would require additional steps.

Neutralization of the entire sulfation mixture as required by the usual method is a disadvantage in the preparation of metal alkyl sulfates. The inorganic base, for example lithium hydroxide or zinc carbonate, must be used in amount sufficient to form the desired metal alkyl sulfate and also to neutralize the sulfating agent present. Separation of the resulting metal alkyl sulfate from inorganic sulfate, unreacted long chain alcohol and by-products is difficult and several steps may be required to isolate a metal alkyl sulfate of adequate purity. Separation difficulties increase with increase in the molecular weight of the long chain alcohol, particularly when the chain contains as many as 16, 18 or 22 carbon atoms.

The method of forming metal alkyl sulfates from a more soluble salt, such as sodium dodecyl sulfate has the disadvantage that it is an indirect method. Furthermore the method of metathesis or double decomposition is not feasible for products from alcohols of higher molecular weight since sodium hexadecyl sulfate and sodium octadecyl sulfate for example are only sparingly soluble at room temperature; hence it would be difficult and uneconomical to form a less soluble metal alkyl sulfate from the sodium salts.

The disadvantages of the usual methods apparent for metal alkyl sulfates exist similarly for salts with amines and amino acids. Briefly, neutralization of the entire sulfation mixture makes separation of pure salts very difficult, and formation by metathesis, for example from the ammonium salt, depends upon adequate difference in solubility between the ammonium salt and the salt to be formed; and frequently this does not exist.

In contrast to the usual methods, the method of our invention, which makes use of the isolated long chain alkylsulfuric acid, is free from the disadvantages recited and leads directly to the formation of salts of exceptional purity.

The solubility of the long chain alkylsulfuric acids in either water or organic solvents was found to facilitate the preparation of pure metal alkyl sulfates of mono-, di-, or trivalent metals from the corresponding inorganic bases, such as, for example, lithium hydroxide, magnesium carbonate, zinc carbonate, and from the acetates of cadmium, copper, barium, lead, and cobalt, as well as the preparation of pure salts from ammonia, amines, amino acids, or other nitrogenous bases, by suitable choice of solvents. In most cases the salts are advantageously formed by the addition of the solid inorganic salt or nitrogenous base to a solution of the long chain alkylsulfuric acid in 95% ethanol or absolute ethanol, followed by filtration at room temperature to obtain the pure crystalline salt of the alkylsulfuric acid. Alternative methods are to add the metal salt or nitrogenous base as a concentrated aqueous solution or slurry to a solution of the alkylsulfuric acid in alcohol or water; or to add the solid metal salt or nitrogenous base to a solution of alkylsulfuric acid in a solvent such as ether or carbon tetrachloride.

According to the present invention long chain alkylsulfuric acids are prepared and isolated in a pure state by a process in which a long chain alcohol, such as an alcohol having 12 to 22 carbon atoms in the molecule, is sulfated at low temperatures, preferably about 30° C. or below, by employing a slight excess of a sulfating agent in the presence of an organic, low-boiling solvent, for example, the halogenated hydrocarbons which are inert with respect to the sulfating agent to produce the alkylsulfuric acid, crystallizing the alkylsulfuric acid by cooling the solution to about 0° C. or lower, and rapidly collecting the crystals from the mixture at low temperature, about 0° C., and in the absence of moisture to recover pure alkylsulfuric acid.

Rapid filtration, low temperature, and the absence of moisture were found to be essential to avoid the partial hydrolysis and decomposition which can occur in the presence of small amounts of water and concentrated mineral acids during the isolation process.

Rapid filtration and removal of the solid long chain alkylsulfuric acid from solvent containing a small amount of mineral acid, in the absence of moisture, can be accomplished by careful selection of the filtering medium. A polyethylene filter medium is quite suitable with compression of the product and exclusion of moisture by means of a rubber dam. The same object can be achieved by centrifugation at low temperature, decantation, washing by decantation, and centrifugation. The product may then be further dried to remove solvent or may be used directly in the preparation of salts.

The sulfating agent may be sulfuric acid, oleum, chlorosulfonic acid or other liquid sulfating agent. The halogenated hydrocarbon may be chloroform, carbontetrachloride, difluorodichloromethane, tetrachloroethylene, and the like. The preferred conditions include the use of chlorosulfonic acid as the sulfating agent, the use of chloroform as the low boiling solvent and the use of higher melting long chain alcohols such as tetradecanol, hexadecanol, octadecanol or docosanol. Commercial mixtures of long chain alcohols such as hydrogenated tallow alcohols and saturated long chain alcohols from marine sources, are also suitable starting materials.

Among the amines which may be employed are ammonia, methylamine, ethylamine, ethanolamine, trimethylolmethylamine, 2-amino-2-hydroxymethyl-1,3-propanediol, urea, guanidine, 2-benzyl-2-thiopseudourea, aniline, and pyridine.

Among the amino acids which may be employed are glycine, DL-alanine, DL-leucine, L-methionine, DL-aspartic acid, L-glutamic acid, glycylglycine, and betaine.

The long chain alkylsulfuric acids of our invention are surface active agents and detergents, soluble in water or oil or organic solvents, for use under acid conditions as textile assistants, emulsifying agents, and detergents, as in the detergency of wool under acid conditions. The long chain alkylsulfuric acids of our invention are also valuable intermediates for the preparation of metal salts or salts with nitrogenous bases, in an exceptional state of purity. The structure of the amino acid salts as substituted ammonium salts derived from the amino group of the amino acid was confirmed by infrared examination.

The long chain alkylsulfuric acids of our invention are also valuable intermediates for the production of ethers, esters and olefins.

The metal alkyl sulfates are detergents and surface active agents, suitable also in lubricant greases, and as addition agents to improve the properties of lubricating oils.

The salts of long chain alkylsulfuric acids with nitrogenous bases are detergents, surface active agents, emulsifying agents and agents with pharmaceutical properties.

The purity of the long chain alkylsulfuric acids of our invention is illustrated in Table I.

TABLE I.—LONG CHAIN ALKYLSULFURIC ACIDS $ROSO_3H$

| Alkyl group, R | Analysis | | | | Melting Point, °C. | Purity,[1] Percent |
| --- | --- | --- | --- | --- | --- | --- |
| | Neutralization equivalent | | Percent S | | | |
| | Found | Theory | Found | Theory | | |
| Dodecyl | 260 | 266 | 11.63 | 12.04 | 25–27 | 97 |
| Tetradecyl | 296 | 294 | 10.88 | 10.89 | 37–39 | 98 |
| Hexadecyl | 323 | 323 | 9.72 | 9.94 | 40–42 | 98 |
| Octadecyl | 354 | 351 | 9.14 | 9.15 | 51–52 | 99 |

[1] Purity by conversion to the sodium salt $ROSO_3Na$ and analysis for sodium.

The purity of the amine and amino acid salts prepared by the process of our invention is illustrated for salts of octadecylsulfuric acid in Table II.

TABLE II.—AMINE AND AMINO ACID SALTS OF OCTADECYLSULFURIC ACID

| | Melting Point, °C. | Analysis | | | |
| --- | --- | --- | --- | --- | --- |
| | | Percent N | | Percent S | |
| | | Found | Theory | Found | Theory |
| Amine: | | | | | |
| Ammonia | ([1]) | 3.60 | 3.81 | 8.92 | 8.72 |
| Triethlamine | 70–72.5 | 2.98 | 3.10 | 6.90 | 7.09 |
| Triethanolamine | 86.0–86.8 | 2.78 | 2.80 | 6.56 | 6.42 |
| 2-amino-2-hydroxymethyl-1,3-propanediol | 124–127 | 2.94 | 2.97 | 6.72 | 6.79 |
| Urea | 113–114 | 6.68 | 6.82 | 7.75 | 7.81 |
| Guanidine | 145–146.4 | 10.26 | 10.26 | 7.67 | 7.83 |
| 2-benzyl-2-thiopseudourea | 95.8–97.2 | 5.45 | 5.40 | 11.72 | 12.41 |
| Aniline | 124.8–125.8 | 2.79 | 3.16 | 7.87 | 7.23 |
| Pyridine | 103–106.5 | 3.17 | 3.26 | 7.75 | 7.46 |
| Amino Acid: | | | | | |
| Glycine | ([1]) | 3.33 | 3.29 | 7.01 | 7.53 |
| DL-alanine | ([1]) | 3.19 | 3.26 | 7.29 | 7.38 |
| DL-leucine | ([1]) | 3.14 | 2.91 | 6.78 | 6.66 |
| L-methionine | ([1]) | 2.78 | 2.80 | 12.97 | 12.83 |
| DL-aspartic acid | ([1]) | 2.89 | 2.89 | 6.63 | 6.90 |
| L-glutamic acid | 18–83 | 2.64 | 2.82 | 6.01 | 6.44 |
| Glycylglycine | ([1]) | 5.61 | 5.81 | 6.60 | 6.64 |
| Betaine | 108–109 | 2.94 | 3.00 | 6.83 | 6.85 |

[1] Amino acid salts in general do not have definite melting points.

The purity of metal alkyl sulfates prepared by the process of our invention is illustrated for salts of octadecylsulfuric acid in Table III.

TABLE III.—METAL SALTS OF OCTADECYLSULFURIC ACID

| Metal Ion | Melting Point, °C. | Analysis | | | |
|---|---|---|---|---|---|
| | | Percent Metal | | Percent S | |
| | | Found | Theory | Found | Theory |
| Li+ | 184.5–185 d | 1.93 | 1.95 | 9.04 | 8.99 |
| Na+ | 189.5–191 | 6.15 | 6.17 | 8.58 | 8.61 |
| K+ | 182–3 | 10.11 | 10.06 | 8.17 | 8.25 |
| Ag+ | 153–8 d | | | 7.23 | 7.01 |
| Be++ | (1) | 1.35 | 1.27 | | |
| Mg++ | (1) | 3.37 | 3.36 | 9.06 | 8.86 |
| Ca++ | (1) | 5.40 | 5.42 | 8.50 | 8.67 |
| Sr++ | 165–6 d | 11.18 | 11.14 | | |
| Ba++ | 172.8–173 d | 16.39 | 16.42 | 7.64 | 7.67 |
| Co++ | 180 d | 7.76 | 7.78 | | |
| Cu++ | 135–40 d | 8.14 | 8.33 | 8.57 | 8.41 |
| Zn++ | (1) | 8.59 | 8.56 | 8.40 | 8.39 |
| Cd++ | 193–6 d | 13.77 | 13.85 | 8.02 | 7.90 |
| Pb++ | 151.8–152 d | 22.90 | 22.86 | 7.32 | 7.08 |
| Al+++ | 162 d | 2.36 | 2.54 | | |

[1] Metal alkyl sulfates in general do not have sharp definite, melting points.

The preparation of the long chain alkylsulfuric acids of our invention, and the preparation of metal alkyl sulfates and salts with nitrogenous bases by the process of our invention is illustrated by the following examples.

Example I

Octadecylsulfuric acid.—n-Octadecanol, 0.4 mole, 108 g., $n_D^{60}$ 1.4359, M.P. 58.1–58.6° C., was added to 540 ml. of chloroform (5 ml./g. solvent ratio) in a 2-liter, 3-neck flask equipped with a mechanical stirrer, a thermometer, and a graduated, side-arm type, addition tube. The mixture was warmed to 30° C. to complete solution, cooled to ice bath temperature (4–5° C.) and 0.432 mole (50.4 g., 8% excess) of chlorosulfonic acid was added dropwise with stirring during 18 minutes of 4–7° C. Stirring was continued for three hours at 15–30° C. and the solution was allowed to crystallize overnight at 0° C.

To maintain low humidity conditions and insure rapid filtration at reduced pressure the crystalline solid-solvent mixture was filtered through a polyethylene filter medium on a Buchner funnel in a low humidity room at 0° C. A layer of vinyl sheeting was placed on top of the crystalline mass in the funnel and then a rubber dam to exclude moisture, compress the crystalline mass, and hasten filtration. The polyethylene filter was necessary because filter paper becomes parchmentized by the sulfating agent. The vinyl sheeting protected the crystalline solid from contamination and stain by the rubber dam.

Octadecylsulfuric acid was obtained as a white crystalline solid M.P. 51–52°, yield 66%, with the analysis shown in Table I. Further quantities of less pure octadecylsulfuric acid could be obtained from the chloroform filtrate.

Example II

Hexadecylsulfuric acid.—n-Hexadecanol, 0.2 mole, 48.7 g., $n_D^{60}$ 1.4359, M.P. 49.3–49.6°, was added to 146 ml. of chloroform (3 ml./g. solvent ratio) in a 1-liter, 3-neck, flask equipped with a mechanical stirrer, a thermometer, and a side arm type addition tube. The mixture was warmed slightly to complete solution, cooled to 4° C., and 0.216 mole (25.2 g., 8% excess) of chlorosulfonic acid was added dropwise during 12 minutes at 3–7° C. Stirring was continued for one hour at 15–30° C. and the solution was allowed to crystallize overnight at 0° C.

The crystalline solid-solvent mixture was filtered at 0° C. under low humidity conditions as described in Example I. Hexadecylsulfuric acid was obtained as a white crystalline solid M.P. 40–42°, yield 63%, with the analysis shown in Table I. Analyses for C and H gave 59.51% C, 10.71% H, in good agreement with the theoretical values of 59.59% C and 10.63% H.

Example III

Tetradecylsulfuric acid.—n-Tetradecanol, $n_D^{60}$ 1.4318, M.P. 37.2–38.0° was sulfated with chlorosulfonic acid under the conditions of Example I, but with a lower solvent ratio (2.5 ml. of chloroform/g. of tetradecanol).

Tetradecylsulfuric acid was isolated under low humidity conditions as a white crystalline solid, M.P. 37–39°, yield 75%, with the analysis shown in Table I.

Example IV

Dodecylsulfuric acid.—n-Dodecanol, $n_D^{25}$ 1.4410, M.P. 24.1° C. was sulfated with chlorosulfonic acid under the conditions of Example I but with a lower solvent ratio (2.5 ml. of chloroform/g. of dodecanol).

Dodecylsulfuric acid was isolated by crystallization at −20° C. and filtration at 0° C. under low humidity conditions, as a white crystalline solid M.P. 25–27° C. with the analysis shown in Table I.

Example V

Ammonium octadecyl sulfate.—Concentrated aqueous ammonia, 2.5 ml., 29% was added dropwise to a stirred solution of 10 g. (0.0285 mole) of octadecylsulfuric acid in 50 ml. of absolute ethanol at 10–15°. The mixture was heated to the boiling point, the hot turbid solution was filtered, and the clean filtrate was allowed to crystallize at room temperature.

Ammonium octadecylsulfate, $C_{18}H_{37}OSO_3NH_4$, was obtained as a white crystalline solid, neutralization equivalent 365 (theory 368), yield 80%, with the analysis shown in Table II.

Example VI

Triethylammonium octadecyl sulfate.—Triethylamine, 4.8 g., was added in portions to a solution of 10 g. of octadecylsulfuric acid in 40 ml. of carbon tetrachloride at 15–20° and the clear solution was allowed to crystallize at 0° C.

Triethylammonium octadecyl sulfate,

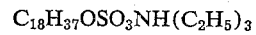

$$C_{18}H_{37}OSO_3NH(C_2H_5)_3$$

was obtained as a white crystalline solid M.P. 70–72.5° C., neutralization equivalent 453 (theory 452), yield 66%, with the analysis shown in Table II.

Example VII

Triethanolammonium octadecyl sulfate.—Triethanolamine, 6.6 g., was added dropwise to a slurry of 15 g. (0.0427 mole) of octadecylsulfuric acid in 160 ml. of carbon tetrachloride at 10–15° C. The mixture was heated to the boiling point, filtered hot, and the filtrate was allowed to crystallize at room temperature.

The salt was obtained as a slightly yellow product, neutralization equivalent 488 (theory 500), yield 93%; recrystallization from methanol gave triethanolammonium octadecyl sulfate, $C_{18}H_{37}OSO_3NH(C_2H_4OH)_3$, M.P. 86–86.8° C., neutralization equivalent 500, yield 73%, with the analysis shown in Table II.

Example VIII

Urea salt of octadecylsulfuric acid.—Urea, 1.71 g., was added in portions to a solution of 10 g. of octadecylsulfuric acid in 55 ml. of absolute ethanol at 23–29° C. Stirring was continued for 1.5 hours and the mixture was filtered at room temperature.

The urea salt $C_{18}H_{37}OSO_3NH_3CONH_2$ was obtained as a white crystalline solid M.P. 113–114° C., neutralization equivalent 412 (theory 411), yield 64%, with the analysis shown in Table II.

Example IX

Guanidine salt of octadecylsulfuric acid.—Guanidine carbonate 2.57 g. was added to a solution of 10 g. of octadecylsulfuric acid in 105 ml. of 95% ethanol at 23–25° C. The mixture was stirred for three hours and allowed to crystallize at 0° C.

The guanidine salt

was obtained as soft white crystals M.P. 145–146.4° C., yield 87%, with the analysis shown in Table II. Since guanidine is a strong base the guanidine salt of octadecylsulfuric acid is neutral.

Example X

*Aniline salt of octadecylsulfuric acid.*—Aniline 2.65 g. was added dropwise to a solution of 10 g. of octadecylsulfuric acid in 50 ml. of absolute ethanol at 7° C. Heat of neutralization raised the temperature to 19° C. Stirring was continued for ten minutes and the mixture was filtered at room temperature.

The aniline salt $C_{18}H_{37}OSO_3NH_3C_6H_5$ was obtained as white crystalline platelets M.P. 124.8–125.8° C., neutralization equivalent 444 (theory 444), yield 86%, with the analysis shown in Table II.

Example XI

*Pyridine salt of octadecylsulfuric acid.*—Pyridine 2.75 g. was added dropwise to a solution of 10 g. of octadecylsulfuric acid in 75 ml. of absolute ethanol at 12–17° C. Stirring was continued for one hour and the mixture was filtered at room temperature.

The pyridine salt $C_{18}H_{37}OSO_3NHC_5H_5$ was obtained as a white crystalline solid, M.P. 103–106.5° C., neutralization equivalent 433 (theory 430), yield 86%, with the analysis shown in Table II.

Example XII

*Glycine salt of octadecylsulfuric acid.*—Glycine 2.6 g. was added to a stirred solution of 10 g. of octadecyl sulfuric acid in 90% ethanol at 25° C. The mixture was heated to 60° C. then cooled to 30° C., filtered to remove a small excess of glycine and allowed to crystallize at room temperature.

The glycine salt $C_{18}H_{37}OSO_3NH_3CH_2CO_2H$ was obtained as a white solid, yield 80% with the analysis shown in Table II.

Example XIII

*DL-leucine salt of octadecylsulfuric acid.*—DL-leucine 2.2 g. was added in portions to a solution of 10 g. of octadecylsulfuric acid in 100 ml. of absolute ethanol at 25° C. The mixture was heated to 60° C., cooled to 40° C., filtered to remove a small excess of leucine and allowed to crystallize at 0° C.

The DL-leucine salt was obtained as a white solid, yield 56%, with the analysis shown in Table II. Infrared examination confirmed that the salt may be represented as

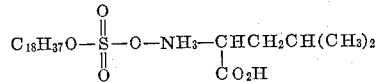

since the $CO_2H$ is present with no ionization to

there is no free amine, the band for $NH_3{}^+$ could be detected and characteristic absorption for sulfate ester was also present.

Example XIV

*Betain salt of octadecylsulfuric acid.*—Betaine monohydrate 3.86 g. was added to a solution of 10 g. of octadecylsulfuric acid in 100 ml. of absolute ethanol at 22–30° C. Stirring was continued for 1.5 hours and the mixture was filtered at room temperature and recrystallized from absolute ethanol.

The betaine salt, $C_{18}H_{37}OSO_3N(CH_3)_3CH_2CO_2H$, was obtained as soft white crystals M.P. 108–109° C., neutralization equivalent 466 (theory 468), yield 64%, with the analysis shown in Table II.

Example XV

*Lithium salt of octadecylsulfuric acid.*—Lithium hydroxide solution, 15 ml., 5% aqueous, was added stepwise to a solution of 10 g. of octadecylsulfuric acid in 50 ml. of absolute ethanol at 10–15° C. The mixture was stirred for about 1 hour at room temperature then allowed to crystallize at 0° C. overnight.

The white product, yield 85%, recrystallized from absolute ethanol gave lithium octadecylsulfate $$C_{18}H_{37}OSO_3Li$$

M.P. 184.5–185.5 d., yield 67%, with the analysis shown in Table III.

Example XVI

*Magnesium salt of octadecylsulfuric acid.*—Magnesium carbonate, $4MgCO_3 \cdot Mg(OH)_2 \cdot nH_2O$, 1.4 g. was added in portions to a solution of 10 g. of octadecylsulfuric acid in 100 ml. of 95% ethanol at 10–15° C. On stirring for 5 minutes at room temperature a thick paste resulted. The mixture was heated to the boiling point, filtered hot, and the filtrate allowed to crystallize at 0° C.

The white, crystalline product $(C_{18}H_{37}OSO_3)_2Mg$ yield 68%, M.P. >200°, gave the analysis shown in Table III.

Example XVII

*Cadmium salt of octadecylsulfuric acid.*—Cadmium acetate, 3.8 g., was added in portions to a solution of 10 g. of octadecylsulfuric acid in 50 ml. of 95% ethanol at room temperature (20° C.). The mixture was stirred for one hour, heated to the boiling point on the steam bath, then filtered hot and the clear filtrate was allowed to crystallize at 0° C.

The white crystalline salt recrystallized from absolute ethanol gave cadmium octadecyl sulfate $$(C_{18}H_{37}OSO_3)_2Cd$$

M.P. 193–196° d., yield 72% with the analysis shown in Table III.

Example XVIII

*Copper salt of octadecylsulfuric acid.*—Cupric acetate, 2.8 g., was added in portions to a solution of 10 g. of octadecylsulfuric acid in 50 ml. of 95% ethanol at room temperature. After stirring for 30 minutes the pasty mixture was heated to the boiling point on the steam bath, filtered hot, and the clear filtrate allowed to crystallize at room temperature. The blue-green cupric octadecyl sulfate, $(C_{18}H_{37}OSO_3)_2Cu$, yield 80%, H.P. 135–140° d., gave the analysis shown in Table III.

Example XIX

*Barium salt of octadecylsulfuric acid.*—Barium acetate monohydrate, 3.9 g. in 5 ml. of distilled water, was added stepwise to a solution of 10 g. of octadecylsulfuric acid in 100 ml. of absolute ethanol at room temperature. The temperature rose to 30°; stirring was continued for 10 minutes. The white precipitate obtained on filtration was then heated in 400 ml. of 50% ethanol solution and filtered hot. White barium octadecyl sulfate $$(C_{18}H_{37}OSO_3)_2Ba$$

yield 90% M.P. 172.8–173° d., gave the analysis shown in Table III.

Example XX

*Lead salt of octadecylsulfuric acid.*—Lead acetate, 5.4 g. in 5 ml. of distilled water, was added stepwise to 10 g. of octadecylsulfuric acid in 100 ml. of absolute ethanol at room temperature. Stirring was continued for 15 minutes. The white material obtained on filtration was taken up in 200 ml. of 75% ethanol and the slightly turbid solution was filtered hot. The filtrate was heated to boiling and allowed to stand at room temperature for crystallization.

The white lead octadecyl sulfate, $(C_{18}H_{37}OSO_3)_2Pb$, yield 83%, M.P. 151.8–152.2 d., gave the analysis shown in Table III.

*Example XXI*

*Cobalt salt of octadecylsulfuric acid.*—Cobalt acetate, 3.6 g. in 10 ml. of distilled water, was added stepwise to 10 g. of octadecylsulfuric acid in 50 ml. of absolute ethanol at room temperature. After 20 minutes' stirring the pasty mixture was heated to boiling, filtered and the clear filtrate allowed to crystallize at 0° C.

The pink crystalline solid (cobaltous oxide ash 10.2%, theory 9.9%) yield 89%, on recrystallization from absolute ethanol gave cobalt octadecyl sulfate, $$(C_{18}H_{37}OSO_3)_2Co$$

yield 78%, M.P. 180° d., with the analysis shown in Table III.

*Example XXII*

*Zinc salt of octadecylsulfuric acid.*—Zinc carbonate, 1.8 g. was added in portions to 10 g. of octadecylsulfuric acid in 55 ml. of absolute ethanol at room temperature. The mixture was stirred for 30 minutes, heated to the boiling point on the steam bath, filtered hot and the clear filtrate allowed to crystallize at 0° C.

The white powdery zinc octadecyl sulfate, $$(C_{18}H_{37}OSO_3)_2Zn$$

yield 89%, M.P. indefinite about 150° d., gave the analysis shown in Table III.

*Example XXIII*

*Aluminum salt of octadecylsulfuric acid.*—

$$Al_2(SO_4)_3 \cdot 18H_2O$$

4.1 g. in 10 ml. of distilled water, was added to 10 g. of octadecylsulfuric acid in 800 ml. of distilled water at 60° C.; the mixture was stirred for 20 minutes, filtered hot and the sticky white material taken up in 25 ml. of absolute ethanol and allowed to crystallize at 0° C.

White amorphous hygroscopic aluminum octadecyl sulfate, $(C_{18}H_{37}OSO_3)_3Al$, yield 89%, M.P. 153–162° d., gave the analysis shown in Table III.

*Properties of long chain alkylsulfuric acids, salts with amino acids, and long chain metal alkyl sulfates*

Octadecylsulfuric acid, as an example of the long chain alkylsulfuric acids of our invention was found to have a surprisingly low critical micelle concentration, about one-third of the value for sodium octadecyl sulfate. The c.m.c. by the dye titration method was found to be 0.0387 millimoles/1. Conductance and pH measurements of aqueous solutions of octadecylsulfuric acid including measurements at both above and below the c.m.c indicate that octadecylsulfuric acid is about 50% ionized over a considerable concentration range, indicating that in aqueous solutions octadecylsulfuric acid exists as a micelle composed of ionized and unionized molecules.

Octadecylsulfuric acid was found to be surprisingly resistant to hydrolysis. Hydrolysis of a 0.05 molar solution at 100° C. was 50% in less than half an hour, about equal to that for sodium octadecyl sulfate acidified with an equivalent amount of mineral acid. However, at 60° C. (140° F.), a frequently selected washing temperature, the degree of hydrolysis was only 10% after 3 hours and 16% after 7 hours. These kinetic data do not fit conventional rate expressions because micellization occurs with a decrease in the concentration of simple ions and molecules. The surprising degree of stability of the long chain alkylsulfuric acids to hydrolysis increases their general field of usefulness. Other properties of octadecylsulfuric acid, and of the amine and amino acid salts are illustrated in Table IV.

TABLE IV.—PROPERTIES OF OCTADECYLSULFURIC ACID, AMINE SALTS AND AMINO ACID SALTS

| Acid or Salt | Solubility 25° C. | | | pH | 0.1% Aqueous Solutions | | | | Foam Height[2] 60° C., mm. |
| --- | --- | --- | --- | --- | --- | --- | --- | --- | --- |
| | Water, percent | Butanol, percent | Chloroform, percent | | Surface and Interfacial Tension, dynes/cm. | | Detergency[1] at 60° C. | | |
| | | | | | S.T. | I.T. | Cloth A | Cloth B | |
| Octadecylsulfuric acid | 1 | 5 | >10 | 3.13 | 41.6 | 10.4 | 40.2 | 23.4 | 195 |
| Amine Salts: | | | | | | | | | |
| Triethylamine | 1 | >10 | >10 | 5.15 | 38.4 | 7.0 | 13.8 | 12.4 | 190 |
| Triethanolamine | 10 | 1 | 0.1 | 5.15 | 40.9 | 7.0 | 19.0 | 19.8 | 190 |
| 2-amino-2-hydroxymethyl-1,3-propanediol | 1 | 0.1 | 0.1 | 4.90 | 40.1 | 9.1 | 29.7 | 21.9 | 205 |
| Amino Acid Salts: | | | | | | | | | |
| Glycine | 0.1 | 0.1 | 0.1 | 3.40 | 41.1 | 6.5 | 39.7 | 22.9 | 210 |
| DL-Leucine | 0.5 | 5 | 5 | 3.30 | 36.1 | 4.3 | 9.9 | 16.6 | 180 |
| L-Methionine | 1 | 10 | 5 | 3.30 | 37.4 | 5.9 | 13.4 | 18.4 | 200 |

[1] Measured as increase in reflectance after washing in the Terg-O-Tometer. Cloth A and Cloth B represent different soil removal problems in washing cotton.

[2] Ross-Miles pour foam test (Oil & Soap 18, 99–102 (1941)).

The data of Table IV demonstrates a useful degree of solubility for the long chain alkylsulfuric acid and its salts in both water and organic solvents. The data also demonstrates detergent and surface active properties. The low interfacial tension of the amino acid salts indicates exceptional emulsifying properties, further evident in Tables V and VI. The best detergents for cotton of those evaluated in Table IV, are the octadecylsulfuric acid, the salt with 2-amino-2-hydroxymethyl-1,3-propanediol, and the glycine salt, which remove soil from cotton under acid conditions without damage to the fiber. Similar evaluation with standard soiled wool showed that octadecylsulfuric acid was a better detergent at 45° C. than a well established commercial detergent (sodium dodecyl sulfate) and a representative ester type nonionic detergent (oxyethylated oleic acid).

The long chain alkylsulfuric acids of our invention and the amine and amino acid salts thereof are excellent emulsifying agents quite superior to sodium oleate and commercial surface active agents, as shown in Tables V and VI. The salts of the long chain alkylsulfuric acids have the further advantage that they may be formed "in situ" from a solution of the long chain alkylsulfuric acid in the organic solvent or oil phase and an aqueous solution of the amine or amino acid. Conversely the salts may be formed "in situ" from an aqueous solution of the long chain alkylsulfuric acid and a solution of the amine or amino acid in an organic solvent. "In situ" formation of the emulsifying agent at the interface or junction of the two immiscible liquids is often very effective in the formation of stable technical emulsions.

TABLE V.—EMULSIFYING PROPERTIES

| Emulsifying Agent | Relative Stability of Emulsion with Paraffin Oil. Method of Manual, Violent, Intermittent Shaking,[1] Seconds |
|---|---|
| Octadecylsulfuric acid | 1,190 |
| Salts: | |
| Triethylamine | 690 |
| Triethanolamine | 730 |
| 2-amino-2-hydroxymethyl-1,3-propanediol | 730 |
| Glycine | 1,050 |
| DL-Leucine | 1,170 |
| L-Methionine | 840 |
| Sodium oleate | 350 |

[1] Briggs, T. R., J. Phys. Chem. 24, 120–126 (1920); time required for 10 ml. to break from an emulsion of 40 ml. paraffin oil with 40 ml. 0.1% solution of emulsifying agent in distilled water.

TABLE VI.—EMULSIFYING PROPERTIES

| Emulsifying Agent | Relative Stability of Emulsion with Immiscible Organic Solvents. Method of Atlab Emulsion Testing Apparatus [1] | |
|---|---|---|
| | Organic Solvent | Time |
| Salts of octadecylsulfuric acid: | | |
| Triethylamine | Butanol | 5 hr. |
| Triethanolamine | do | 5 hr. |
| 2-amino-2-hydroxymethyl-1,3-propanediol | do | 5½ hr. |
| DL-Leucine | Chloroform | 72 hr. |
| | Carbon Tetrachloride | 36 hr. |
| | Tetrachloroethylene | 24 hr.[2] |
| | o-Dichlorobenzene | 48 hr. |
| | Turpentine | 2 hr.[2] |
| Sodium oleate | Chloroform | 84 seconds. |
| Commercial alkylphenol type nonionic surface active agents. | Butanol | 240 seconds. |

[1] W. C. Griffin and R. W. Behrens, Anal. Chem. 24, 1076–7 (1952). Emulsions prepared by mechanically shaking 25 ml. organic solvent with 25 ml. 0.2% solution of emulsifying agent in water; noting the time required for 10% separation from the emulsion.
[2] Salt prepared "in situ" from an aqueous solution of the amine or amino acid and a solution of octadecylsulfuric acid in the organic solvent.

TABLE VII.—SOLUBILITY OF PURE METAL ALKYL SULFATES OF OCTADECYLSULFURIC ACID, AT 25° C.

| Metal Ion | Water | Butanol | Aniline | Plasticizers and Lubricants [1] |
|---|---|---|---|---|
| NH₄⁺ | 0.1% | 5% | 1% | i.[2] |
| Li⁺ | 1% | 1% | 0.1% | DOP, DOS, TOF. |
| K⁺ | 0.1% | 0.1% | i | DBS, SAE-10, TOF. |
| Ag⁺ | i | 1% | 10% | TOF. |
| Be⁺⁺ | i | 10% | 0.1% | DBS, DOP, DOS, SAE-10, TOF. |
| Mg⁺⁺ | 0.1% | 0.1% | i | TOF. |
| Ca⁺⁺ | i | i | i | i. |
| Sr⁺⁺ | i | i | i | DBS, DOS, TOF. |
| Ba⁺⁺ | i | i | i | i. |
| Co⁺⁺ | i | 10% | 1% | i. |
| Cu⁺⁺ | i | 10% | 10% | i. |
| Zn⁺⁺ | 0.1% | 0.1% | 1% | TOF. |
| Cd⁺⁺ | i | 1% | 1% | TOF. |
| Pb⁺⁺ | i | i | 1% | DOP, DOS, TOF. |
| Al⁺⁺⁺ | i | 0.1% | 5% | |

[1] Solubility of 1% or greater. DBS = dibutyl sebacate, DOP = dioctyl phthalate, DOS = dioctyl sebacate, SAE-10 = petroleum lubricating oil, TOF = trioctyl phosphate.
[2] The symbol "i" indicates a solubility of less than 0.1%.

We claim:

1. A process for preparing a substantially pure amino acid salt of an alkylsulfuric acid comprising reacting chlorosulfonic acid with an n-alkanol of the formula ROH wherein R is an n-alkyl group having 12 to 22 carbon atoms, said n-alkanol being in solution in a low-boiling halogenated hydrocarbon inert with respect to the chlorosulfonic acid, at a temperature below about 30° C. to convert the alkanol to an alkylsulfuric acid of the formula

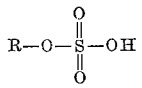

wherein R has the same significance as above, cooling the reaction solution to below about 0° C. to crystallize the alkylsulfuric acid, collecting the crystallized alkylsulfuric acid from the resulting mixture at about 0° C., and in the absence of moisture to recover substantially pure alkylsulfuric acid, mixing the substantially pure alkylsulfuric acid, in solution in a solvent selected from the group consisting of chloroform, an alkanol, an aqueous alkanol, ether and water, with at least a stoichiometric amount of an amino acid selected from the group consisting of glycine, DL-alanine, DL-leucine, L-methionine, DL-aspartic acid, L-glutamic acid, glycylglycine, The solubility of the pure metal alkyl sulfates prepared by the process of our invention is illustrated in Table VII in the case of salts derived from the isolated octadecylsulfuric acid.

Most of the metal alkyl sulfates of Table VII are insoluble or nearly so in water, benzene, carbon tetrachloride and Skellysolve B. The ammonium, silver, beryllium, cobalt, copper and aluminum salts have surprising solubilities of 5% or greater in one or more of the representative organic solvents. Salts capable of forming an ammonio complex, particularly the silver and copper salts, are quite soluble in aniline. Many of the metal salts are soluble to the extent of 1% or greater in plasticizers and lubricants and remain in solution even at —20° C. The lithium, potassium, silver, beryllium, magnesium, strontium, zinc, cadmium and lead salts are soluble to a surprising degree in trioctyl phosphate. The lithium, potassium, beryllium, strontium and lead salts are soluble in many plasticizers and lubricants. Solubility in lubricants indicates usefulness as an addition agent to improve the properties of lubricating oils.

and betaine to form the corresponding amino acid salt of the alkylsulfuric acid having the formula

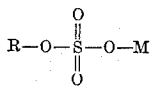

wherein R has the same significance as above and M is a substituted ammonium radical corresponding to the the amino acid, cooling the reaction mixture to crystallize the formed salt, and collecting the salt crystals to recover the salt in substantially pure form.

2. A process for preparing a substantially pure amino acid salt of an alkylsulfuric acid comprising mixing a substantially pure alkylsulfuric acid of the formula

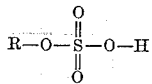

wherein R is an n-alkyl group having 12 to 22 carbon atoms, in solution in a solvent selected from the group consisting of chloroform, an alkanol, an aqueous alkanol, ether, and water, with at least a stoichiometric amount of an amino acid selected from the group consisting of glycine, DL-alanine, DL-leucine, L-methionine, DL-aspartic acid, L-glutamic acid, glycylglycine, and betaine to form the corresponding amino acid salt of the alkylsulfuric acid having the formula

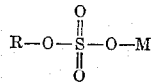

wherein R has the same significance as above and M is a substituted ammonium radical corresponding to the amino acid, cooling the reaction mixture to crystallize the formed salt, and collecting the salt crystals to recover the salt in substantially pure form.

3. The process of claim 2 wherein the alkylsulfuric acid is octadecylsulfuric acid.

4. The process of claim 2 wherein the alkylsulfuric acid is octadecylsulfuric acid and the amino acid is glycine.

5. The process of claim 2 wherein the alkylsulfuric acid is octadecylsulfuric acid and the amino acid is DL-leucine.

6. The process of claim 2 wherein the alkylsulfuric acid is octadecylsulfuric acid and the amino acid is L-methionine.

7. The process of claim 2 wherein the alkylsulfuric acid is octadecylsulfuric acid and the amino acid is betaine.

References Cited by the Examiner
UNITED STATES PATENTS

| | | | |
|---|---|---|---|
| 2,163,651 | 6/1939 | Werntz | 260—459 |
| 2,323,980 | 7/1943 | Dreyfus | 260—459 |
| 2,577,218 | 12/1951 | Van Der Warden | 252—358 |
| 2,781,391 | 2/1957 | Mannheimer | 260—459 |

OTHER REFERENCES

Uchiumi et al.: C. A., volume 52, page 8185g (1958).

CHARLES B. PARKER, *Primary Examiner*.

F. D. HIGEL, *Assistant Examiner*.